US011815153B2

United States Patent
Yuan et al.

(10) Patent No.: US 11,815,153 B2
(45) Date of Patent: Nov. 14, 2023

(54) PASSIVE MOTION ISOLATION SYSTEM

(71) Applicant: Calient Technologies, Inc., Goleta, CA (US)

(72) Inventors: Shifu Yuan, Goleta, CA (US); Norm Gardner, Goleta, CA (US); Ernest M. Leos, Goleta, CA (US); Augie Ramirez, Goleta, CA (US); Nan Luo, Goleta, CA (US); Sajanish Balagopal, Goleta, CA (US); Mike Hopkins, Goleta, CA (US)

(73) Assignee: Calient Technologies, Inc., Goleta, CA (US)

( * ) Notice: Subject to any disclaimer, the term of this patent is extended or adjusted under 35 U.S.C. 154(b) by 758 days.

(21) Appl. No.: 16/803,053

(22) Filed: Feb. 27, 2020

(65) Prior Publication Data

US 2020/0284316 A1    Sep. 10, 2020

Related U.S. Application Data (60) Provisional application No. 62/815,743, filed on Mar. 8, 2019.

(51) Int. Cl.
| F16F 15/08 | (2006.01) |
| F16M 11/04 | (2006.01) |
| F16M 11/20 | (2006.01) |
| F16F 3/087 | (2006.01) |

(52) U.S. Cl.
CPC .......... *F16F 15/08* (2013.01); *F16M 11/046* (2013.01); *F16M 11/2085* (2013.01); *F16M 11/2092* (2013.01); *F16F 3/0876* (2013.01); *F16M 2200/047* (2013.01); *F16M 2200/08* (2013.01)

(58) Field of Classification Search
CPC .......... F16F 15/08; F16F 3/0876; F16F 15/02; F16F 15/04; G11B 33/08; G09B 9/02; G09B 9/08; A63G 31/16; G06F 1/1656; F16M 11/046; F16M 11/2085; F16M 11/2092; F16M 11/18; F16M 2200/047; F16M 11/2014; F16M 11/10; F16M 11/2021; F16M 2200/08; B23Q 1/5462
USPC ....................................................... 267/136
See application file for complete search history.

(56) References Cited

U.S. PATENT DOCUMENTS

| 3,323,764 | A | * | 6/1967 | Johnson | ................. | F16F 15/04 |
| | | | | | | 267/152 |
| 4,603,363 | A | * | 7/1986 | Rickert | ................. | F16F 1/426 |
| | | | | | | 267/153 |
| 4,713,714 | A | * | 12/1987 | Gatti | ................. | G11B 33/08 |
| | | | | | | 360/99.18 |
| 5,307,676 | A | * | 5/1994 | Gutman | ................. | B23Q 1/5462 |
| | | | | | | 33/573 |
| 5,390,892 | A | * | 2/1995 | Platus | ................. | F16F 15/06 |
| | | | | | | 248/619 |

(Continued)

FOREIGN PATENT DOCUMENTS

EP    3448140 A1 *    2/2019    ............ B25B 11/02

*Primary Examiner* — Taylor Morris
(74) *Attorney, Agent, or Firm* — Cecily Anne O'Regan (57) ABSTRACT

A passive motion isolation system for motion-sensitive equipment is disclosed. The passive motion isolation system has a three-axis free motion platform mounted on a base subject to ambient motions. A vibration isolation subsystem is coupled between the motion-sensitive equipment and the three-axis free motion platform.

18 Claims, 8 Drawing Sheets

(56) References Cited

U.S. PATENT DOCUMENTS

| | | | | |
|---|---|---|---|---|
| 5,595,430 A * | 1/1997 | Weyeneth | G11B 33/08 | 312/319.1 |
| 5,794,541 A * | 8/1998 | Hirose | B23Q 1/5462 | 248/371 |
| 6,178,156 B1 * | 1/2001 | Kuwajima | G11B 33/08 | 720/694 |
| 6,359,836 B1 * | 3/2002 | Sevier | H05K 7/1402 | 361/732 |
| 6,378,832 B1 * | 4/2002 | Li | F16F 1/3849 | 267/141.5 |
| 6,477,042 B1 * | 11/2002 | Allgeyer | G11B 33/08 | 360/99.18 |
| 6,809,916 B2 * | 10/2004 | Nakata | F16F 15/04 | 361/115 |
| 7,290,759 B1 * | 11/2007 | Lavrencik | F16F 15/08 | 267/141.1 |
| 7,856,916 B2 * | 12/2010 | Anderson | F41G 1/393 | 248/200.1 |
| 8,240,614 B2 * | 8/2012 | Camarasa | F16F 15/08 | 267/136 |
| 8,480,052 B2 * | 7/2013 | Taylor | G06F 1/187 | 267/152 |
| 9,169,893 B2 * | 10/2015 | Williamson | E02D 3/046 | |
| 9,771,030 B1 * | 9/2017 | DeHaai | F16F 1/3735 | |
| 10,018,988 B2 * | 7/2018 | Heiniger | B23Q 1/626 | |
| 2005/0277092 A1 * | 12/2005 | Hwang | G09B 19/16 | 434/58 |
| 2014/0048989 A1 * | 2/2014 | Platus | F16F 15/04 | 267/140.5 |
| 2015/0292670 A1 * | 10/2015 | Sweere | F16M 11/2021 | 248/188.5 |
| 2017/0144512 A1 * | 5/2017 | Hulst | E05F 5/003 | |
| 2018/0020825 A1 * | 1/2018 | Hung | F16M 11/2021 | 108/31 |
| 2018/0045361 A1 * | 2/2018 | Hsu | F16M 11/10 | |
| 2019/0063669 A1 * | 2/2019 | Ingram | F16M 11/046 | |
| 2019/0283899 A1 * | 9/2019 | Langworthy | F16M 13/022 | |
| 2021/0237219 A1 * | 8/2021 | Baker | B23Q 1/621 | |

* cited by examiner

PASSIVE MOTION ISOLATION SYSTEM

CROSS-REFERENCE

This application claims the benefit of U.S. Provisional Application No. 62/815,743, filed Mar. 8, 2019, entitled Passive Motion Isolation System which application is incorporated herein in its entirety by reference.

BACKGROUND

Field

This disclosure relates to motion isolation systems for motion-sensitive electronic equipment.

Description of the Related Art

Motion-sensitive electronic equipment may include, and/or be mounted on, elastic vibration isolators. A particular combination of a piece of equipment and a vibration isolator will have a natural resonant frequency. The vibration isolator may be effective to minimize or prevent coupling of vibrations from the ambient to the equipment for vibration frequencies significantly higher than the resonant frequency. However, the frequency spectrum of ground motion due to earthquakes may be concentrated at frequencies below 3 Hertz and may include significant motion at frequencies of 0.5 Hz or lower. It is generally impractical to lower the resonant frequency of vibration-isolated equipment to less than 0.5 Hz. Thus conventional vibration isolation systems may be ineffective at isolating the equipment from low-frequency motions such as those caused by earthquakes.

SUMMARY

An aspect of the disclosure is directed to motion isolation systems for motion-sensitive equipment. Suitable motion isolation systems comprise: a base subject to ambient motions; a three-axis free motion platform mounted on the base; and a vibration isolation subsystem coupled between the motion-sensitive equipment and the three-axis free motion platform.

Additionally, the three-axis free motion platforms are configurable to comprise: an x-axis free motion stage and a y-axis free motion stage, the x-axis and the y-axis orthogonal to each other and essentially horizontal, and a z-axis free motion stage, the z-axis being orthogonal to both the x-axis and the y-axis and essentially vertical. For example, the x-axis free motion stage can comprise an x-axis carriage free to move along an x-axis rail, the y-axis free motion stage comprises a y-axis carriage free to move along a y-axis rail, and the z-axis free motion stage comprises a z-axis carriage free to move along a z-axis rail. Additionally, in some configurations the y-axis rail is attached to, and moves with, the x-axis carriage, the z-axis rail is attached to, and moves with, the y-axis carriage, and the vibration isolation subsystem is coupled between the z-axis carriage and the motion-sensitive equipment. In some configurations it might be desirable for the z-axis free motion stage to comprise a counterbalance mechanism to offset a total weight of the z-axis carriage, the vibration isolation subsystem, and the motion-sensitive equipment. The counterbalance mechanism can additionally comprise at least one constant force spring. Each of the x-axis rail, the y-axis rail, and the z-axis rail can be configurable to have a finite length between respective ends, in which case the system can further comprise: a plurality of resilient firm stops, a firm stop from the plurality of firm stops located proximate each end of each of the x-axis rail, the y-axis rail, and the z-axis rail to limit a range of motion of the respective carriage in both directions along the rail. Motion isolation systems can also have a plurality of resilient soft stops, a soft stop from the plurality of soft stops located proximate each end of each of the x-axis rail, the y-axis rail, and the z-axis rail, wherein each soft stop is configured such that a carriage nearing an end of the respective rail contacts the soft stop located proximate the end of the rail before contacting the corresponding firm stop. Each soft stop can also be configured to extend further along the respective rail and has a smaller cross-sectional area than the corresponding firm stop. At least some configurations of the vibration isolation subsystem can further comprise: a support attached to the z-axis carriage; four elongate resilient pillars, each pillar having a first end affixed to the support, a length extending from the support parallel to the z-axis, and a second end; and a mounting structure to couple the motion-sensitive equipment to the second ends of the four pillars. The mounting structure can also be configured such that all or a portion of the motion-sensitive equipment is disposed between the four pillars.

In some configurations the mounting structure is configured such that the motion-sensitive equipment does not contact the four pillars and the support. Each of the four pillars can further comprise first and second segments, the vibration isolation subsystem can also further comprise a first frame, the first segments of each of the four pillars can be configured to couple the mounting structure to the first frame, and the second segments of each of the four pillars couple the first frame to the support. Each of the four pillars can further comprise first, second, and third segments, the vibration isolation subsystem can further comprise first and second frames, and the first segments of the four pillars can couple the mounting structure to the first frame, the second segments of the four pillars couple the first frame to the second frame, and the third segments of the four pillars couple the second frame to the support. In other configurations at least one motion limiter can be provided to limit a range of motion of the mounting structure with respect to the support. One or more motion limiter can further comprise one or more of a resilient grommet attached to the support, and a post extending from the mounting structure through a center hole in the resilient grommet.

Another aspect of the disclosure is directed to methods of using the disclosed motion isolation systems for motion-sensitive equipment.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
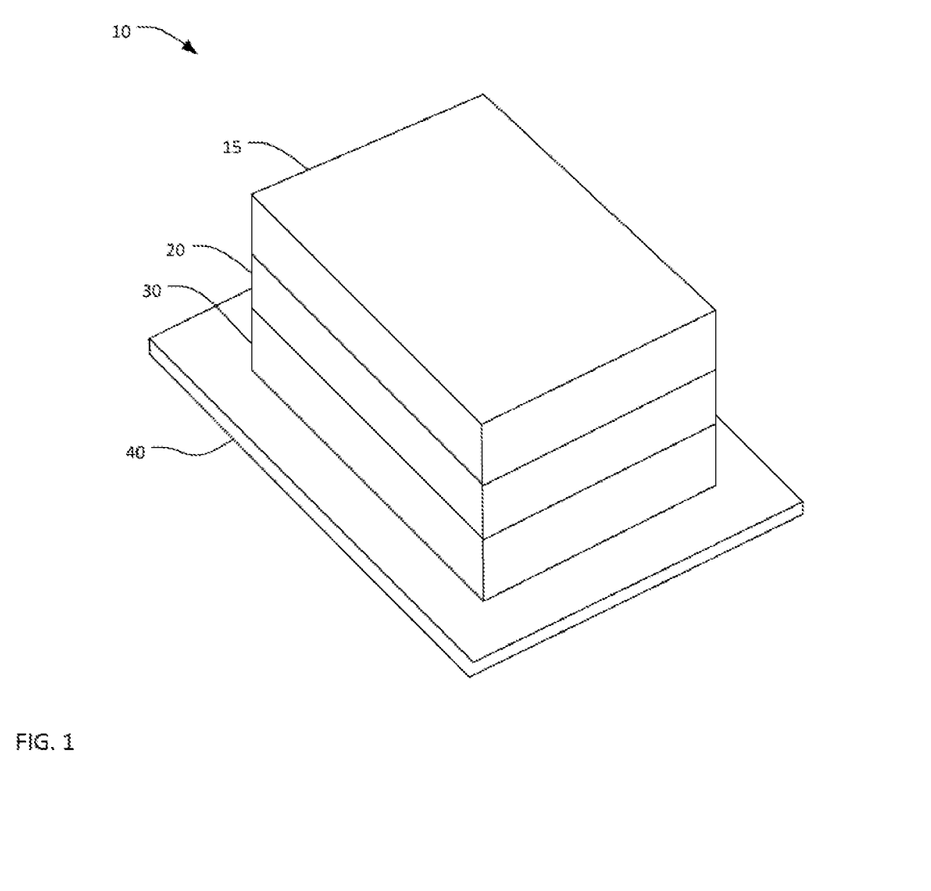
FIG. 1 is a schematic depiction of a passive motion isolation system.
Figure 2:
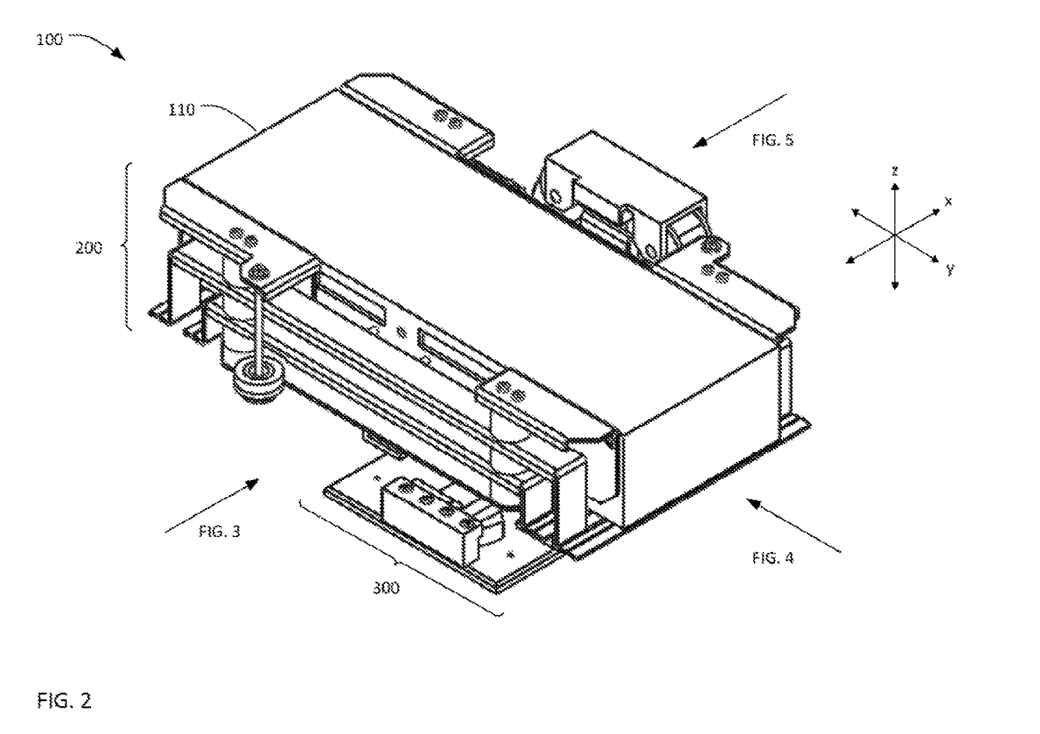
FIG. 2 is a perspective view of a motion isolation system.
Figure 3:
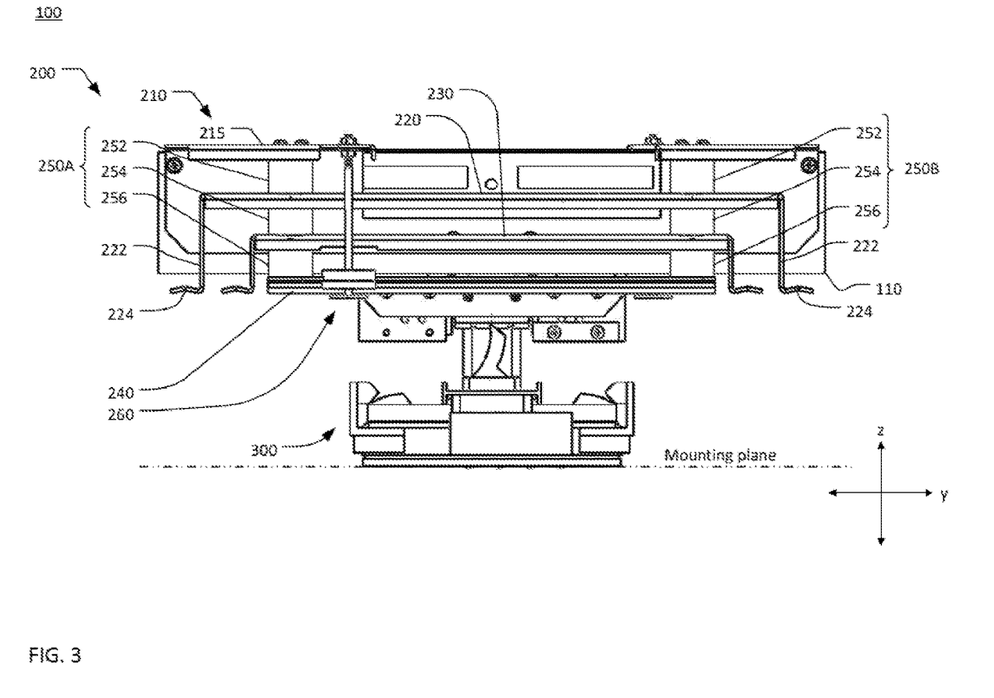
FIG. 3 is a front view of the motion isolation system of FIG. 2.
Figure 4:
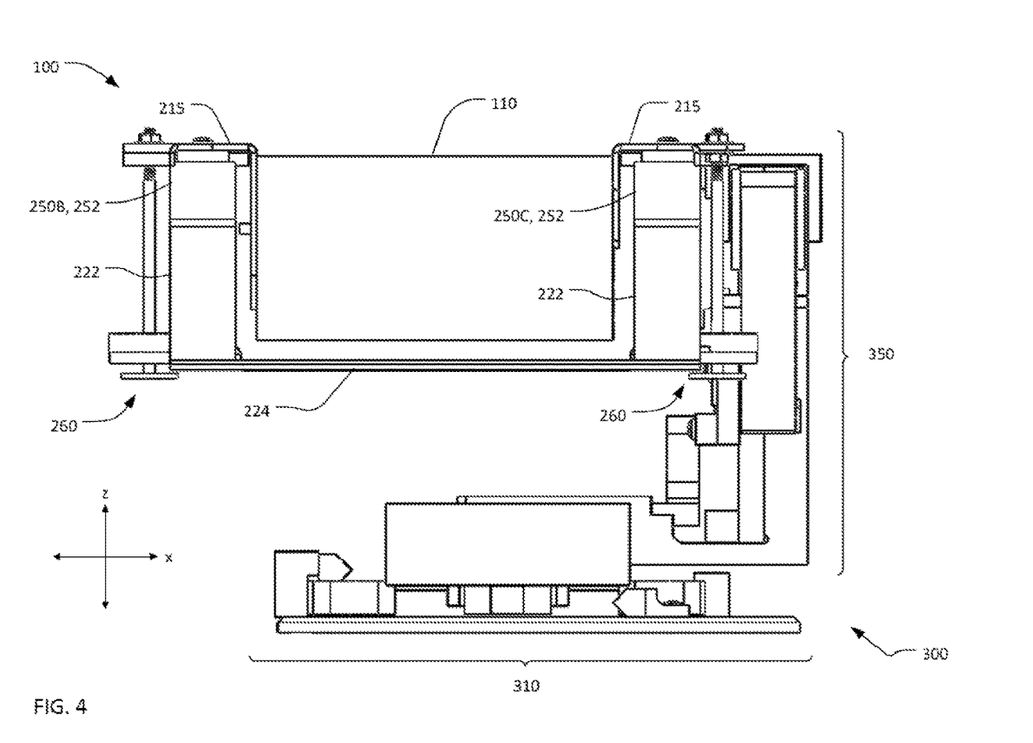
FIG. 4 is an end view of the motion isolation system of FIG. 2.
Figure 5:
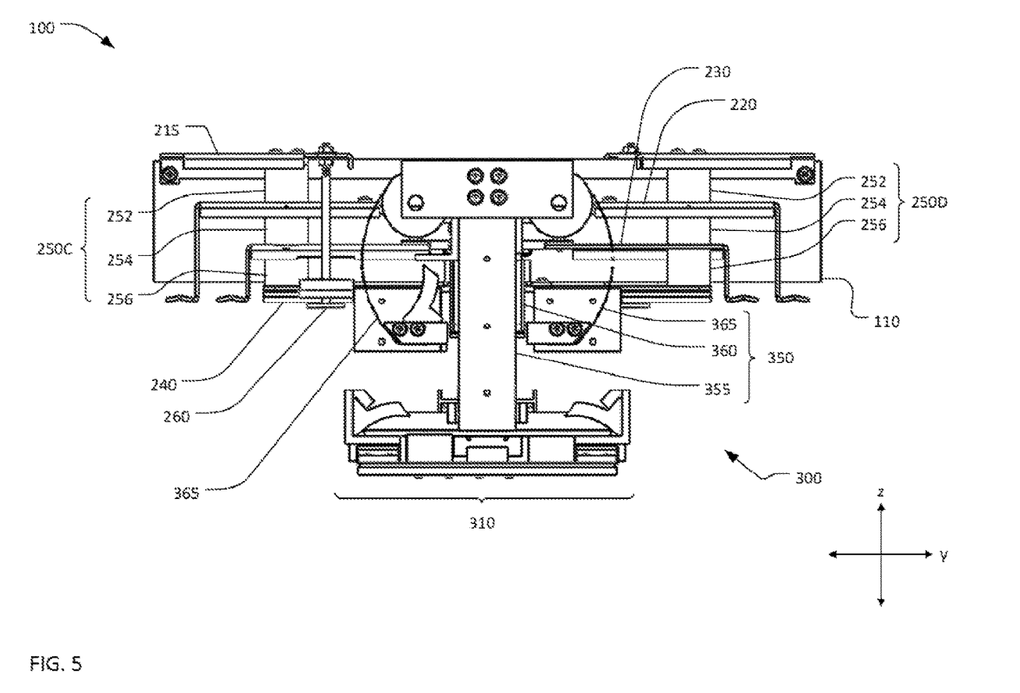
FIG. 5 is a back view of the motion isolation system of FIG. 2.

FIG. 1 is a schematic depiction of a motion isolation system 10 that employs a tiered or stacked structure to isolate motion-sensitive equipment 15 from vibration and movement introduced through a base 40. The equipment 15 is coupled to the base 40 through a two-tiered structure including a vibration isolator 20 and a low-frequency motion isolator 30. The base 40 is subject to ambient movement including, but not limited to, vibrations caused by machinery or traffic; and building motions due to earth quakes. The combination of the equipment 15 and the vibration isolator 20 may have a natural resonant frequency. The vibration isolator 20 may be effective to minimize or prevent coupling of vibrations from the base 40 to the equipment 15 for vibration frequencies significantly higher than the resonant frequency. The low-frequency motion isolator 30 isolates the motion-sensitive equipment 15 from small-amplitude motions of the base 40 for frequencies comparable to, or less than, the resonant frequency. The low-frequency motion isolator 30 isolates larger amplitude low-frequency motions, such as motions caused by earthquakes, so that they are coupled to the motion-sensitive equipment 15 with limited acceleration that may not substantially degrade the performance of the motion-sensitive equipment FIG. 2 is a perspective view of a motion isolation system 100 which is an embodiment of the motion isolation system 10 of FIG. 1. FIG. 3, FIG. 4, and FIG. 5 are front, end, and back views, respectively of the motion isolation system 100. The relative position of various parts of the motion isolation system 100 will be described based upon these views. Throughout this description, terms indicating direction, relative position, or size (e.g. "up", "down", "left", "right", "over", "under", "height", "width", etc.) may be used when referring to the drawing figure As shown in FIG. 2, the motion isolation system 100 includes a vibration isolation subsystem 200 and a multi-axis motion platform 300. Equipment module 110 is supported by the vibration isolation subsystem 200 which is an embodiment of the vibration isolator 20. The vibration isolation subsystem 200 is mounted on the multi-axis motion platform 300, which is an embodiment of the low-frequency motion isolator 30. In FIGS. 2-7, x, y, and z axes are defined for ease of description of the elements of the motion isolation system. In FIGS. 3-8, components of the vibration isolation subsystem 200 are identified by reference designators between 210 and 270. Components of the multi-axis motion platform 300 are identified by reference designators between 310 and 375.

The vibration isolation subsystem 200 is supported by a support 240 which is attached to the multi-axis motion platform 300. In this example, the support 240 is a rigid metal plate. The support 240 may be a plate, a frame, or some other rigid structure. Four elongated resilient pillars 250A, 250B, 250C, 250D, of which only 250A and 250B are visible in FIG. 3, extend upward from the support 240. The other two elongated resilient pillars 250C, 250D are located behind the equipment module 110 as shown in FIG. 5. Each elongated resilient pillar 250A-D has a first end affixed to the support 240, a length extending parallel to the z-axis, and a second end remote from the support 240. The equipment module 110 is coupled to the second ends of the four elongated resilient pillars 250A-D by a mounting structure 210. In this example, the mounting structure 210 consists of two support brackets 215, only one of which is visible in FIG. 3. A second support bracket (which is a mirror image of the support bracket visible in FIG. 3) is located behind the equipment module as shown in FIG. 5. The two support brackets 215 are attached to the second ends of the four elongated resilient pillars 250A-D (each support bracket attaches to two of the elongated resilient pillars 250A-D) and extend downward from a plane defined by the second ends of the four elongated resilient pillars 250A-D. The overall height (i.e., dimension parallel to the z-axis) of the four elongated resilient pillars 250A-D is greater than a height of the equipment module 110 such that the bottom of the equipment module 110 is suspended above the support 240. Other mounting structures may be used to couple an equipment module to the four elongated resilient pillars 250A-D such that all or a portion of the equipment module is disposed between the elongated resilient pillars 250A-D and above the support 240.

Figure 8:
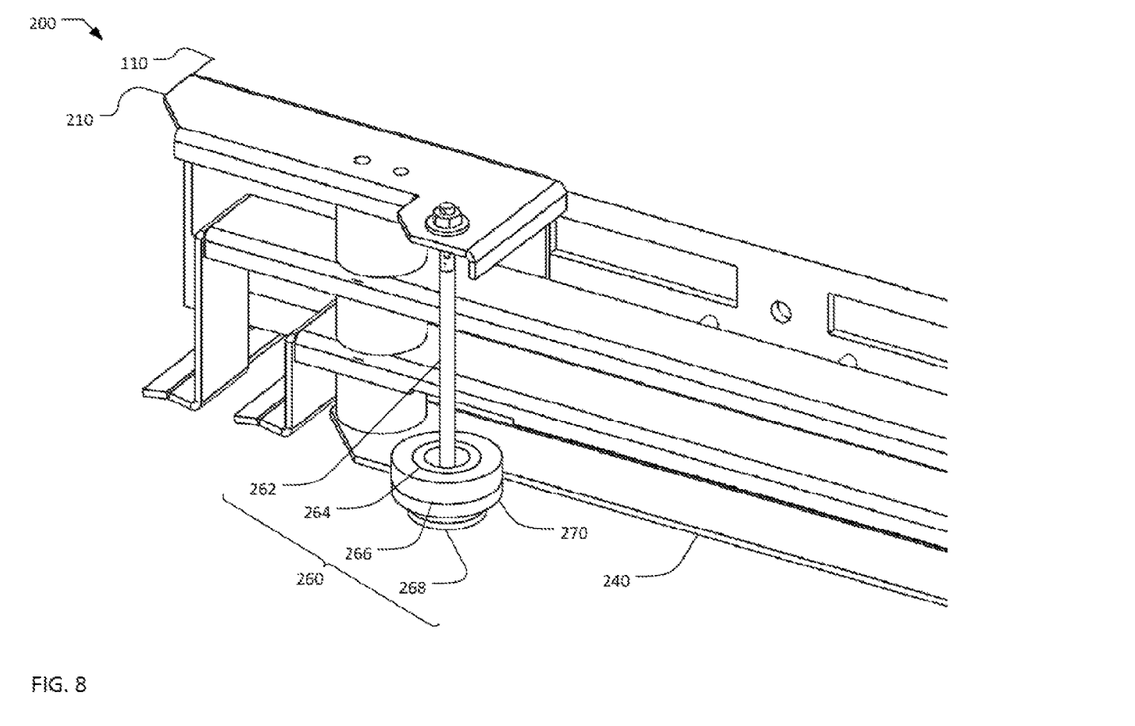
FIG. 8 is a perspective view of a portion of a vibration isolation subsystem showing details of a motion limiter.

To prevent excess lateral or rotational motion of the equipment module 110, each of the four elongated resilient pillars 250A-D may be divided into two or more segments, with joints between the segments connected together by frames that connect the four elongated resilient pillars 250A-D without contacting the mounting structure 210 or equipment module 110. In this example, each elongated resilient pillar 250A-D is divided into upper pillar segment 252, middle pillar segment 254, and lower pillar segments 256 as shown in FIGS. 3, 5 and 8. The mounting structure 210 is coupled to a first frame 220 by four upper pillar segments 252, of which only two are visible in FIG. 3. The first frame 220 is coupled to a second frame 230 by four middle pillar segments 254, of which only two are visible in FIG. 3. The second frame 230 is coupled to the support 240 by four lower pillar segments 256, of which only two are visible in FIG. 3. The upper pillar segment 252, middle pillar segment 254, and lower pillar segment 256 may be made from a resilient or viscoelastic material such as a polyurethane foam. The upper pillar segment 252, middle pillar segment 254, and lower pillar segment 256 may be attached to the associated mounting structure 210, first frame 220, second frame 230, and support 240 by adhesive. Two motion limiters 260 (of which only one is visible in FIG. 2) limit the range of motion of the mounting structure 210 and equipment module 110 with respect to the support 240. The motion limiters will be described in additional detail in conjunction figure FIG. 8.

The left and right ends of the first frame 220 are twice folded to form a vertical portion 222 and a horizontal portion 224 that passes under the equipment module 110. The second frame 230 is similarly folded. Alternatively, the first frame 220 and the second frame 230 could be unfolded. In this case, the ends of the first and second frame will extend beyond the left and right ends of the equipment module 110 (not shown). The folded-frame configuration shown in FIG. 3 is more compact.

The number of segments in each pillar and the number of frames in the vibration isolation subsystem 200 may be tailored to the size and mass of the equipment module. A vibration isolation subsystem may have more or fewer than three segments in each pillar and more or fewer than two frames. The number of segments in each pillar will be equal to the number of frames plus one.

FIG. 4 is an end view of the motion isolation system 100 showing the equipment module 110, the two support brackets 215, the two motion limiters 260, two upper pillar segments 252 of elongated resilient pillars 250B and 250C. It also shows vertical portions 222 and horizontal portion 224 of the first frame 220. The multi-axis motion platform 300 includes an x-axis/y-axis (e.g., x-axis and y-axis) motion stage 310 and a z-axis motion stage 350. Although not visible in FIG. 4, the support 240 of the vibration isolation subsystem 200 is attached to a movable portion of the z-axis motion stage 350.

A motion stage is a mechanical device including a carriage that is movable in a linear direction along an axis defined by a guide. A free-motion stage is a motion stage where the carriage is free to move with respect to the guide, rather than driven by a motor or other positioning device. A motion isolation system that uses only free-motion stages may be considered passive. The guide may be a single rail having a rectangular, triangular, trapezoidal, or x-shaped cross-section, a channel having a u-shaped cross-section, a pair of parallel ways (commonly having circular cross-sections), or some other elongate structure that defines a direction of motion of the carriage. The carriage may be configured to move freely along the guide in the defined direction and may be constrained to not move in directions orthogonal to the defined direction. Typically, a carriage is in contact with two or more surfaces of the guide to prevent motion in directions orthogonal to the defined direction. Friction at the points of contact between a carriage and a guide may be minimized through the use of ball bearings, roller bearings, bushings, lubricants, and/or other devices. Since the length of a guide must be finite, a motion stage typically includes stops to prevent a carriage from moving past the ends of the guide.

Motion stages may be stacked to allow motions along multiple axis. For example, a first motion stage may include a first rail and a first carriage that moves along the first rail in a first direction. A second rail may be attached to the first carriage such that the second rail is not parallel to the first rail. Typically, the second rail may be perpendicular to the first rail. The second carriage moves along the second rail in a second direction, and the second carriage, second rail, and first carriage are free to move, as a unit, along the first rail in the first direction. Similarly, a third rail may be attached to the second carriage, with the third rail typically extending in a direction perpendicular to both the first and second rails.

In the motion isolation system 100, the x and y axes are defined as two orthogonal axes, each of which is essentially horizontal. The z axis is defined to be orthogonal to both the x and y axes and thus essentially vertical. The directions of each of the x and y axes are considered essentially horizontal if a component of gravity along both of the x and y axes is insufficient to cause motion of the corresponding carriage along the respective axis of the x-y motion stage 310.

FIG. 5 is a back view of the motion isolation system 100. The equipment module 110, one of the support brackets 215, the first frame 220 and second frame 230, the support 240, upper pillar segment 250, middle pillar segment 254, lower pillar segment 256 of elongated resilient pillars 250C and 250D, and one of the two motion limiters 260 are visible.

The z-axis motion stage 350 includes a z-axis carriage 360 that slides along a z-axis rail 355. The support 240 is attached to the z-axis carriage 360 such that the z-axis carriage supports the vibration isolation subsystem 200, and the equipment module 110. Since the z-axis is essentially vertical, gravity will attempt to pull the z-axis carriage 360 to its lowest position. To allow the z-axis carriage to float along the z-axis rail without being pulled to its lowest position by gravity, the total weight of the z-axis carriage 360, the vibration isolation subsystem 200, and the equipment module 110 is offset or counterbalanced in the upward direction with a force equal to the total weight. In an exemplary motion isolation system 100, two constant force springs 365 are used to counterbalance the weight of the z-axis carriage 360, the vibration isolation subsystem 200, and the equipment module 110. Other techniques to counterbalance this weight may be used.

Figure 6:
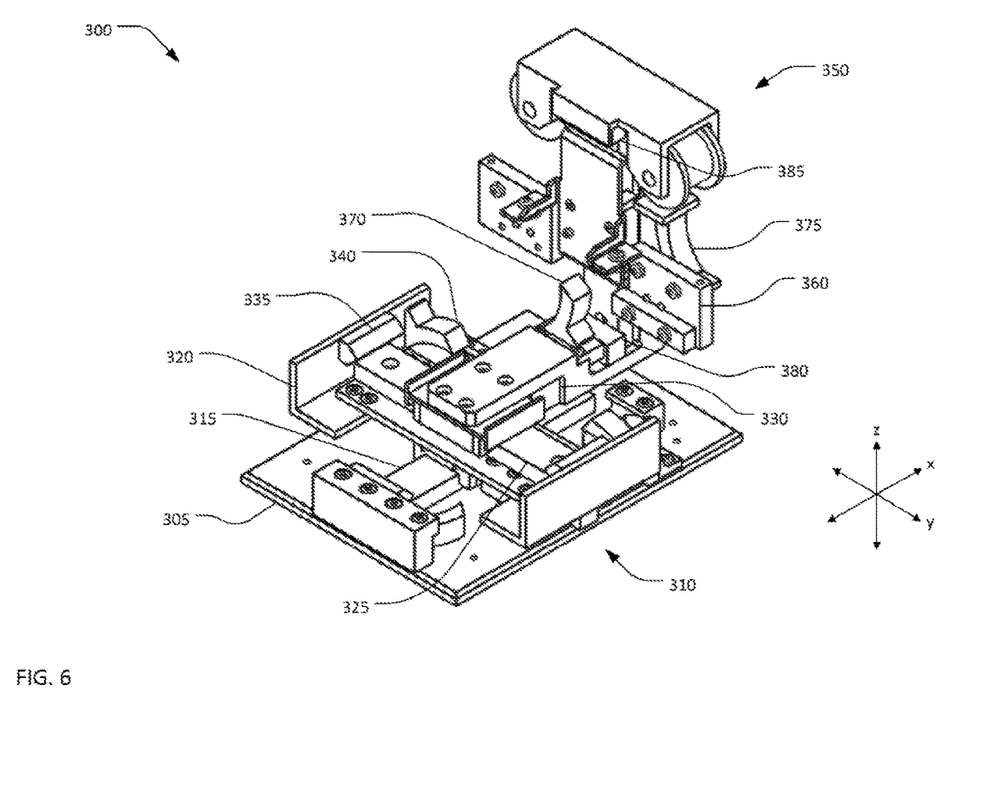
FIG. 6 is a perspective view of a multi-axis motion platform used in the motion isolation system of FIG. 2.
Figure 7:
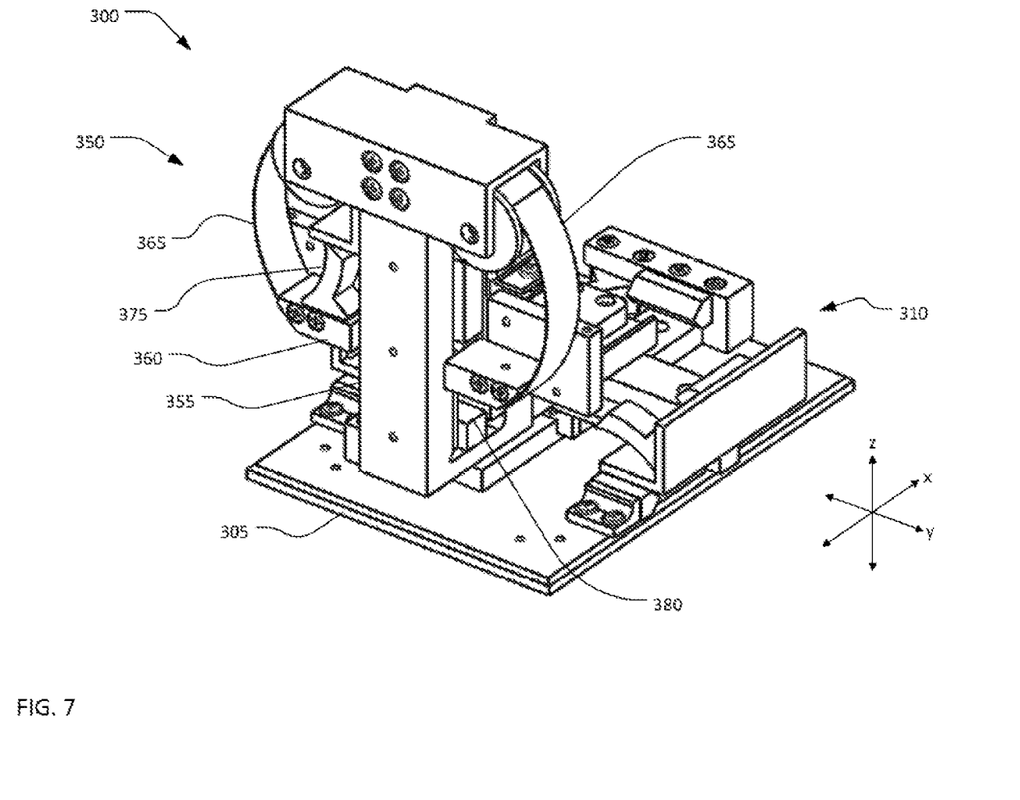
FIG. 7 is another perspective view of the multi-axis motion platform of FIG. 6.

FIG. 6 and FIG. 7 are perspective views of the multi-axis motion platform 300, including the x-y motion stage 310 and the z-axis motion stage 350. Note that the constant force springs 365 are not shown in FIG. 6 to allow visibility of other portions of the z-axis stage 350. The x-y motion stage 310 includes a base 305 that supports an x-axis rail 315. The base 305 is subject to ambient movement including, but not limited to, vibrations caused by machinery or traffic, and building motions due to earth quakes. An x-axis carriage 320 slides along the x-axis rail 315. The x-axis carriage 320 supports a y-axis rail 325. A y-axis carriage 330 slides along the y-axis rail 325. The z-axis rail 355 is supported by the y-axis carriage 330.

The ranges of motion of the carriages 320, 330 along the respective x-axis and y-axis rails 315, 325 are limited by resilient stops. For example, motion of the y-axis carriage 330 to the left (as seen in FIG. 6) along the y-axis rail 325 limited by a soft stop 340 and a firm stop 335. Although not clearly visible or identified in FIG. 6, similar soft and firm stops are positioned at the other end of the y-axis rail 325 and both ends of the x-axis rail 315. The range of motion of the z-axis carriage 360 is limited by soft stops 370 and 375 and firm stops 380 and 385.

The soft stops and firm stops may be made from a resilient or viscoelastic material. Each soft stop (such as the soft stop 340) can be configured to have a longer length and smaller cross-sectional area than each firm stop (such as the firm stop 335). As will be appreciated by those skilled in the art, the length of a stop can be measured along the respective motion axis and the cross-sectional area of a stop is measured in a plane orthogonal to the motion axis. A carriage nearing the end of its motion range first contacts a soft stop. The soft stop then compresses and/or deforms to gradually decelerate, but not necessarily stop, the motion of the carriage. The soft stops may be inclined and/or curved with respect to the respective motion axis to ensure both compression and deformation occur. The motion of the carriage is stopped when the carriage reaches a firm stop.

Within the limits of the soft stops and firm stops, the x-, y-, and z-axis carriages 320, 330, 360 are free to move along the respective rails. The range of free motion and the material, shape, and cross-sectional area of the soft and firm stops may be configured based on the weight to be mounted on the x-y motion platform and the environment in which the motion isolation system will be used. The range of free motion may be, for example, one inch or greater along each axis. In another configuration the range of free motion may be, for example, between 1 and 12 inches along each axis.

When the base 305 is subjected to low frequency ambient movements smaller than the free travel range of the carriages 320, 330, 360, inertia may cause one or more of the carriages to slide along their respective rails 315, 325, 355 while the base 305 moves. In this case, the vibration isolation subsystem 200 and the equipment module 110 may remain substantially stationary. When the base 305 is subjected to larger low frequency movements, one or more of the rails 315, 325, 355 may move sufficiently to cause a soft stop to contact the respective carriage 320, 330, 360. In this case, the soft stop will gradually compress and/or deform, coupling the movement of the base to the stage as a gentle acceleration. The length, cross-sectional shape, and material of the stops and the free travel range of the carriages with respect to the rails may be configured such that the worse-case anticipated motions of the base do not disrupt or damage the equipment module. Higher frequency vibrations of the base may be coupled through the multi-axis motion platform 300 to be attenuated by the vibration isolation subsystem 200 (see FIG. 3).

FIG. 8 is a perspective view of a portion of the vibration isolation subsystem 200 showing one of the motion limiters 260. The motion limiter 260 includes a post 262 which is anchored at one end to the mounting structure 210 that supports the equipment module 110. The post 262 extends through a center hole in a grommet 264. The grommet 264 extends through a ring 266 that is attached to the support 240. Motion of the mounting structure 210 with respect to the support 240 in a plane normal to the axis of the post 262 is limited by the post 262 contacting an inner surface of the grommet 264. A washer 270 may be attached to a lower surface (as shown in FIG. 8) of the ring 266. Motion of the mounting structure 210 with respect to the support 240 along the axis of the post 262 is limited by an enlarged head 268 of the post 262 contacting the washer 270. The grommet 264 and the washer 270 may be formed from a resilient or viscoelastic material such as a polyurethane foam. The grommet 264 and the washer 270 may be two separate pieces or combined into a single physical piece. The grommet 264 and the washer 270 may be attached to the ring 266 by adhesive bonding or some other method.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed:

1. A motion isolation system for motion-sensitive equipment, comprising:
    a base subject to ambient motions;
    a three-axis free motion platform mounted on the base, the three-axis free motion platform coupled with the motion-sensitive equipment, the three-axis free motion platform including:
        a first axis carriage free to move along a first axis rail,
        a second axis carriage free to move along a second axis rail,
        a third axis carriage free to move along a third axis rail, each of the first axis rail, the second axis rail, and the third axis rail having a finite length between respective ends;
    a plurality of resilient firm stops, a resilient firm stop from the plurality of resilient firm stops located proximate each end of each of the first axis rail, the second axis rail, and the third axis rail to limit a range of motion of the respective carriage in both directions along the rail; and
    a plurality of resilient soft stops, a resilient soft stop from the plurality of resilient soft stops located proximate each end of each of the first axis rail, the second axis rail, and the third axis rail,
    wherein each resilient soft stop is configured such that a carriage nearing an end of the respective rail contacts the resilient soft stop located proximate the end of the rail before contacting the corresponding resilient firm stop.

2. The motion isolation system of claim 1, wherein
    the second axis rail is attached to, and moves with, the first axis carriage, and
    the third axis rail is attached to, and moves with, the second axis carriage.

3. The motion isolation system of claim 1, further comprising a counterbalance spring to offset a total weight, the total weight including a weight of the third axis carriage, and a weight of the motion-sensitive equipment.

4. The motion isolation system of claim 3, wherein the counterbalance spring comprises at least one constant force spring.

5. The motion isolation system of claim 1, wherein each resilient soft stop extends further along the respective rail and has a smaller cross-sectional area than the corresponding resilient firm stop.

6. The motion isolation system of claim 1, further comprising:
    a first axis linear stage including the first axis carriage;
    a second axis linear stage including the second axis carriage, the first axis linear stage and the second axis linear stage orthogonal to each other and essentially horizontal; and
    a third axis linear stage including the third axis carriage, the third axis linear stage being orthogonal to both the first axis linear stage and the second axis linear stage and essentially vertical.

7. The motion isolation system of claim 1, further comprising:
    a coupler bracket, the three-axis free motion platform coupled with the motion-sensitive equipment via the coupler bracket.

8. The motion isolation system of claim 7, wherein the coupler bracket comprises:
    a support plate attached to the third axis carriage;
    four elongate resilient pillars, each elongate resilient pillar having a first end affixed to the support plate, a length extending from the support plate parallel to a vertical axis, and a second end; and
    a mounting bracket to couple the motion-sensitive equipment to the second ends of the four elongate resilient pillars.

9. The motion isolation system of claim 8, wherein the mounting bracket is configured such that all or a portion of the motion-sensitive equipment is disposed between the four elongate resilient pillars.

10. The motion isolation system of claim 9, wherein the mounting bracket is configured such that the motion-sensitive equipment does not contact the four elongate resilient pillars and the support plate.

11. The motion isolation system of claim 8, wherein:
    each of the four elongate resilient pillars comprises first and second segments,
    the coupler bracket further comprises a first frame,
    the first segments of each of the four elongate resilient pillars couple the mounting bracket to the first frame, and
    the second segments of each of the four elongate resilient pillars couple the first frame to the support plate.

12. The motion isolation system of claim 8, wherein:
each of the four elongate resilient pillars comprises first, second, and third segments,
the coupler bracket further comprises first and second frames,
the first segments of the four elongate resilient pillars couple the mounting bracket to the first frame, the second segments of the four elongate resilient pillars couple the first frame to the second frame, and the third segments of the four elongate resilient pillars couple the second frame to the support plate.

13. The motion isolation system of claim 8, further comprising:
at least one grommet to limit a range of motion of the mounting bracket with respect to the support plate.

14. The motion isolation system of claim 13, wherein each of the at least one grommet comprises:
a resilient grommet attached to the support plate; and
a post extending from the mounting bracket through a center hole in the resilient grommet.

15. The motion isolation system of claim 7, further comprising a counterbalance spring to offset a total weight, the total weight including a weight of the third axis carriage, a weight of the coupler bracket, and a weight of the motion-sensitive equipment.

16. The motion isolation system of claim 15, further comprising:
a first axis linear stage including the first axis carriage;
a second axis linear stage including the second axis carriage, the first axis linear stage and the second axis linear stage orthogonal to each other and essentially horizontal;
a third axis linear stage including the third axis carriage, the third axis linear stage being orthogonal to both the first axis linear stage and the second axis linear stage and essentially vertical,
wherein the third axis linear stage comprises the counterbalance spring.

17. The motion isolation system of claim 1, further comprising:
a coupler bracket,
wherein the coupler bracket is coupled between the third axis carriage and the motion-sensitive equipment.

18. A motion isolation system for motion-sensitive equipment, comprising:
a base subject to ambient motions;
a three-axis free motion platform mounted on the base, the three-axis free motion platform coupled with the motion-sensitive equipment, the three-axis free motion platform including:
a first axis carriage free to move along a first axis rail,
a second axis carriage free to move along a second axis rail,
a third axis carriage free to move along a third axis rail, each of the first axis rail, the second axis rail, and the third axis rail having a finite length between respective ends;
a plurality of first stops, a first stop from the plurality of first stops located proximate each end of each of the first axis rail, the second axis rail, and the third axis rail to limit a range of motion of the respective carriage in both directions along the rail; and
a plurality of second stops, a second stop from the plurality of second stops located proximate each end of each of the first axis rail, the second axis rail, and the third axis rail,
wherein each second stop is configured such that a carriage nearing an end of the respective rail contacts the second stop located proximate the end of the rail before contacting the corresponding first stop,
wherein the first stop has a first firmness,
wherein the second stop has a second firmness, and
wherein the first firmness is greater than the second firmness.

* * * * *